July 22, 1924.
C. E. HASS ET AL
COASTER WAGON
Filed Dec. 18, 1920
1,502,337
2 Sheets-Sheet 2
FIG·3
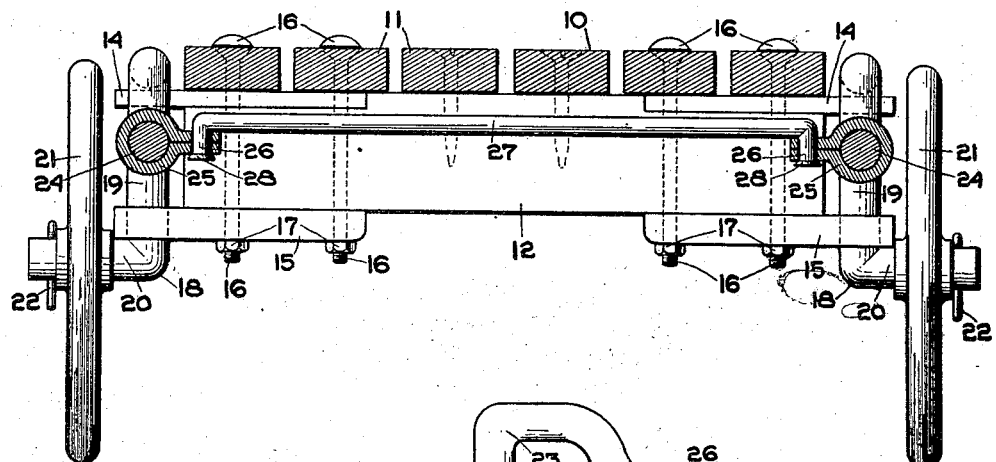
FIG·4
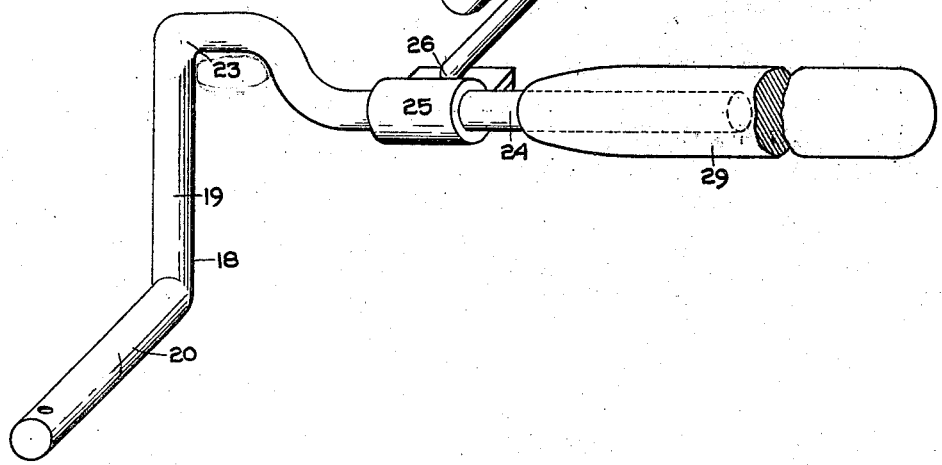
INVENTORS:
CLARENCE E. HASS
WILLIAM R. JAMES
WITNESS:
BY
ATTORNEYS Patented July 22, 1924.

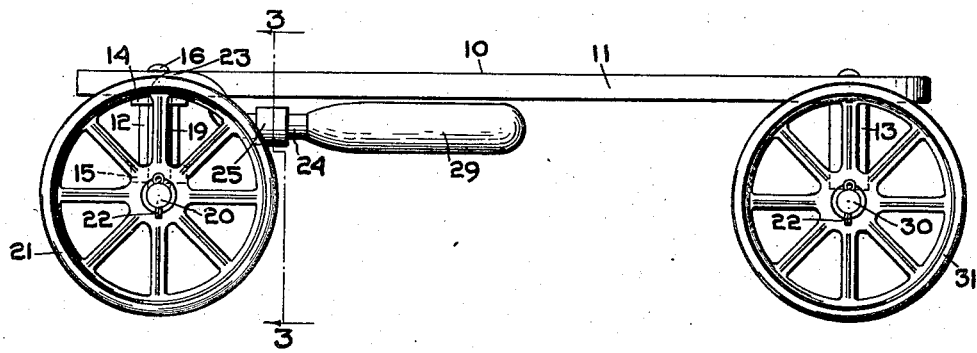
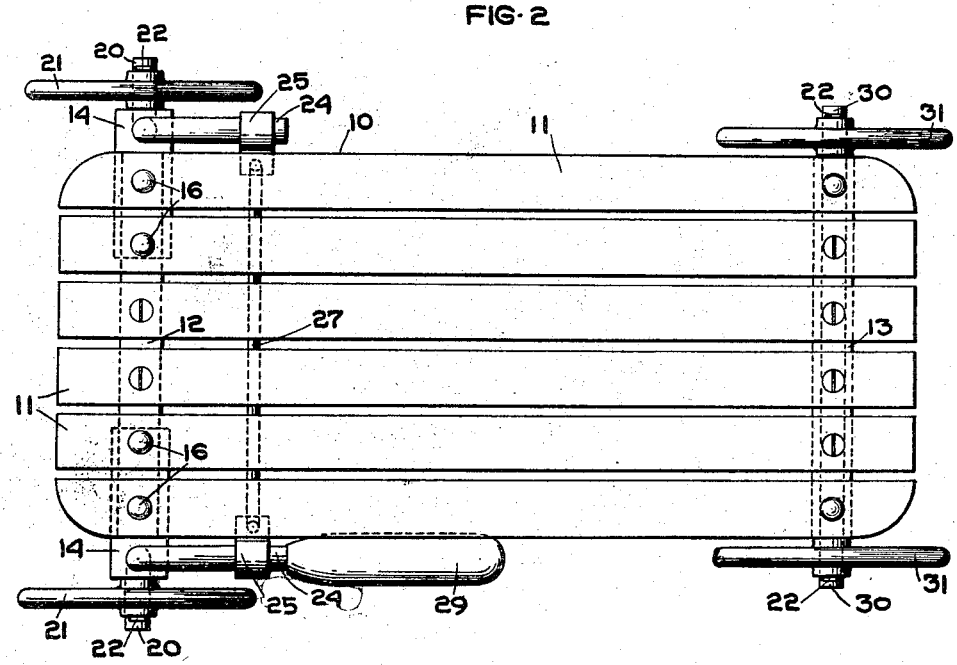

1,502,337

UNITED STATES PATENT OFFICE.

CLARENCE E. HASS AND WILLIAM R. JAMES, OF CHICAGO, ILLINOIS.

COASTER WAGON.

Application filed December 18, 1920. Serial No. 431,564.

*To all whom it may concern:*

Be it known that we, CLARENCE E. HASS and WILLIAM R. JAMES, citizens of the United States, residing at Chicago, in the county of Cook and State of Illinois, have invented certain new and useful Improvements in Coaster Wagons, of which the following is a specification.

This invention relates to wheeled vehicles, and contemplates particularly the provision of a novel coaster wagon for children, to provide, for the warmer months, a coasting vehicle which, in its manner of use, constitutes the equivalent of the hand-sled of winter.

The coaster wagon of this invention is intended primarily to accommodate one youngster, and may be used for coasting along a level or down an incline in the same manner as a sled. In coasting down an incline the child may either sit or lie prone, head foremost, upon the body portion of the wagon; while, in coasting along a level, the child may pick up the wagon by grasping it at each side, run with it, and, when sufficient momentum is acquired, lower the wagon to the ground and fall prone upon it, in the same manner as when using a hand-sled.

The device of this invention is particularly well suited for this latter form of coasting, in that it is characterized by a low, elongated and preferably flexible body portion supported on four relatively small wheels, and provided with a steering mechanism conveniently operated by one hand of the child while grasping, at the same time and in a natural manner, the edge of the body portion of the wagon.

The principal objects of the invention are to provide a coaster wagon such as described, which may be produced at a low cost; which is of light yet durable construction; which will maintain a high degree of stability regardless of the angle at which the steering wheels are turned relative to the wagon portion; and which is characterized by a strong efficient and reliable steering mechanism controlled in a convenient manner.

Numerous other objects and advantages of the invention will become apparent as the nature of the same is better understood from the accompanying drawings and the following detailed description based thereon, the invention residing primarily in the novel construction and arrangement of parts hereinafter disclosed.

The drawings and description referred to are based upon, what is now considered to be, a preferred embodiment of the invention, but, inasmuch as this invention is evidently capable of embodiment in other forms wherein certain of the unessential details of construction are varied, it should be understood that the specific disclosure here made, for purposes of exemplification, is not intended to limit unnecessarily the spirit of the invention or the scope of the appended claims.

In the drawings:

Fig. 1 is a side elevation of the coaster wagon of this invention;

Fig. 2 is a top plan view of the same;

Fig. 3 is an enlarged sectional view taken on the line 3—3 of Fig. 1 to illustrate, primarily, the mounting of the steering mechanism; and Fig. 4 is a perspective view of the steering mechanism.

Having reference to the drawings the numeral 10 indicates in general the body portion of the wagon which, in order to provide a limited amount of flexibility or springiness, is preferably composed of a plurality of spaced parallel slats 11 secured, near the front end of the wagon, to a bolster 12, and, near the rear end, to a bolster 13. Each of said bolsters is positioned at right angles to the slats 11 and terminates at either side even with the outermost slats.

The upper face of the front bolster 12 is cut away, for a short distance near each end thereof, to provide two spaces into each of which is fitted, below the two outermost slats of the body portion, a rectangular metal plate 14. A heavier plate 15, similar in shape to plate 14, is positioned below and near each end of bolster 12, in direct vertical alignment with the upper plate 14. Bolts 16 pass downwardly through each of the two outermost slats, the upper plates, bolster and lower plates, and are provided at their lower ends with nuts 17 by means of which said elements are formed into one rigid structure.

Plates 14 and 15 extend laterally a short distance past the ends of bolster 12 and form overlapping, spaced ears at each side of the body portion 10. Said ears are provided with vertically aligned circular apertures in which is pivotally mounted the steering mechanism of this invention, and said ears thereby constituting bearing members for said steering mechanism.

This mechanism comprises, at each side of the front end of the body portion, a rod 18, the medial portion 19 of which is rotatably mounted, in an upright position, in the aligned apertures of the ears of plates 14 and 15. Immediately below the lower plate 15 said rod is abruptly bent laterally, and forms thereby a stub axle 20 on which is rotatably mounted a wheel 21. The outer end of plate 15 and a cotter pin 22, or other suitable securing means, prevent longitudinal movement of wheel 21 on its axle. Immediately above the upper plate 14 rod 18 is abruptly bent rearwardly for a short distance, as at 23, until clear of the rear edge of plate 14, at which point said rod curves downwardly and then continues rearwardly as a horizontal arm 24.

At corresponding points on the spaced parallel arms 24, are attached annular band clips 25, the contiguous flanged portions of which are apertured to receive the downwardly bent extremities 26 of a horizontal connecting link or rod 27. The extremities 26 are capable of pivoting in the apertures of the flanged portions of clips 25, but are prevented from axial movement therein because of upset ends 28. The link 27, in forming a spacing connection between the horizontal arms 24, is positioned a little below the slats 11 of the body portion, and a short distance to the rear of the bolster 12.

One of the arms 24 continues rearwardly beyond clip 25, and is there formed, or telescoped, into an elongated guiding handle or grip 29. This guiding handle extends rearwardly along one side of the body portion, when the front, or steering, wheels are positioned parallel to the longitudinal axis of the wagon, and can be conveniently held by one when gripping, at the same time, that side of the wagon.

The rear bolster 13 has fixedly attached to its under side, by suitable means, a rear axle 30, on each end of which is rotatably mounted a wheel 31, secured thereon by cotter pins 22, or other suitable means.

From the construction above described it will now be understood that, upon lateral movement of handle 29 in either direction, the stub shafts 20, carrying wheels 21, will both be moved, simultaneously, through an equal angle from their normal position.

Inasmuch as the distance between each wheel 21 and its corresponding pivoting axis, at the upright portion 19 of rod 18, is small in comparison to the distance between the handle 29 and its pivoting axis, also at the upright portion 19 of rod 18, a leverage results which makes the front wheels easy to control, and decreases, to a minimum, the chances of a sudden deflection of the wheels upon encountering irregular obstacles in the path of travel.

Furthermore, because of the novel steering mechanism employed in this coaster wagon wherein the pivoting points of the front stub axles are as widely separated as possible, the stability of the vehicle is not appreciably lessened when the wheels are turned at an angle to the wagon, as in rounding corners. This, on the other hand, is not true of the ordinary wagon wherein the front steering wheels are mounted on a common axle which is pivoted at its medial point, and, in order to turn, said wheels must necessarily approach the central longitudinal axis of the vehicle, thus decreasing the stability thereof.

As illustrated, the handle 29 is in a lower plane than the body portion 10 to provide proper clearance for movement of the handle. The handle, therefore, may swing beneath the body when moved in the direction thereof, and this insures the requisite angular positioning of the steering wheels for turning the coaster.

We claim:

1. In a coaster, the combination with a wagon body portion, and wheels for supporting the same, of a steering mechanism including two stub axles, means for pivoting each of said axles about a separate vertical axis, means to control simultaneously and equally the movement of said axles about their pivoting axes, and a steering handle positioned adjacent one side of the wagon body portion and normally parallel thereto, said handle being in a lower plane than the body portion, whereby to swing beneath the latter when moved in the direction thereof.

2. In a coaster, the combination with a wagon body portion, and wheels for supporting the same, of a steering mechanism including two stub axles, means for pivoting each of said axles about a separate vertical axis, arms extending rearwardly from said vertical axes in a fixed relation to their corresponding stub axles, means for maintaining said arms parallel to each other at all times, and a handle mounted on the rear end of one of said arms and extending rearwardly therefrom, said handle normally lying in a plane parallel to the adjacent side of the body portion and below the latter.

3. In a coaster, the combination with a wagon body portion, and wheels for supporting the same, of a steering mechanism including two stub axles, means for pivoting each of said axles about a separate vertical axis, arms extending rearwardly from said vertical axes in a fixed relation to their corresponding stub axles, a rod connecting said rearwardly-extending arms and provided with abrupt right angularly bent ends, arm-encircling band clips carried by said rearwardly-extending arms and provided with flanged portions apertured to receive the bent ends of said rod, and means associated with one of said arms for steering the vehicle.

4. In a coaster, the combination with a wagon body portion, and wheels for supporting the same, of a steering mechanism comprising two angulated rods, each of said rods including a vertically disposed medial portion, a laterally bent stub axle at the lower end of said medial portion, and a rearwardly bent horizontal arm at the upper end of the medial portion, means for pivotally connecting said medial portions to the wagon body portion, and a guiding handle carried by one of said arms and positioned adjacent one side of the wagon body portion.

5. In a coaster, the combination with a wagon body portion, and wheels for supporting the same, of a steering mechanism comprising two angulated rods, each of said rods including a vertically disposed medial portion, a laterally bent stub axle at the lower end of said medial portion, and a rearwardly bent horizontal arm at the upper end of the medial portion, means for pivotally connecting said medial portions to the wagon body portion, and a handle mounted on the rear end of one of said arms and extending rearwardly therefrom, said handle normally lying in a plane parallel to the adjacent side of the body portion and below the latter.

6. In a coaster, the combination with a wagon body portion, and wheels for supporting the same, of a steering mechanism comprising two angulated rods, each of said rods including a vertically disposed medial portion, a laterally bent stub axle at the lower end of said medial portion, and a rearwardly bent horizontal arm at the upper end of the medial portion, a pair of spaced bearing members arranged at each side of the body portion, the medial portion of one of said angulated rods being pivotally mounted in each pair of said bearing members, and a guiding handle carried by one of said arms and positioned adjacent one side of the wagon body portion.

7. In a coaster, a wagon body portion including a front bolster, a rear bolster, a top supported on said bolsters, plates attached to said front bolster both above and below the same in such a manner as to overlap the ends thereof and extend laterally from the sides of the wagon body portion, said laterally extending portions of said plates having vertically aligned apertures, stub axles pivotally mounted in said apertures, wheels mounted on said axles, means to control simultaneously and equally the movement of said axles about their pivoting axes, means positioned along one side of the wagon body portion for steering the vehicle, an axle attached to the under side of said rear bolster, and wheels mounted thereon.

In testimony whereof we have hereunto subscribed our names in the presence of two subscribing witnesses.

CLARENCE E. HASS.
WILLIAM R. JAMES.

Witnesses:
RAYMOND L. GREIST,
C. S. BUTLER.